US011481535B2

(12) United States Patent
Tada et al.

(10) Patent No.: US 11,481,535 B2
(45) Date of Patent: Oct. 25, 2022

(54) NUMERICAL INFORMATION GENERATION APPARATUS, NUMERICAL INFORMATION GENERATION METHOD, AND PROGRAM

(71) Applicant: NanoBridge Semiconductor, Inc., Ibaraki (JP)

(72) Inventors: Ayuka Tada, Tokyo (JP); Toshitsugu Sakamoto, Tokyo (JP); Makoto Miyamura, Tokyo (JP); Yukihide Tsuji, Tokyo (JP); Ryusuke Nebashi, Tokyo (JP); Xu Bai, Tokyo (JP)

(73) Assignee: NANOBRIDGE SEMICONDUCTOR, INC., Ibaraki (JP)

( * ) Notice: Subject to any disclaimer, the term of this patent is extended or adjusted under 35 U.S.C. 154(b) by 0 days.

(21) Appl. No.: 17/054,653

(22) PCT Filed: May 14, 2019

(86) PCT No.: PCT/JP2019/019137
§ 371 (c)(1),
(2) Date: Nov. 11, 2020

(87) PCT Pub. No.: WO2019/221124
PCT Pub. Date: Nov. 21, 2019

(65) Prior Publication Data
US 2021/0081591 A1    Mar. 18, 2021

(30) Foreign Application Priority Data
May 15, 2018    (JP) .............................. JP2018-093462

(51) Int. Cl.
*G06F 30/3315*    (2020.01)
*G06F 111/10*    (2020.01)
(Continued)

(52) U.S. Cl.
CPC ...... *G06F 30/3315* (2020.01); *G06F 2111/10* (2020.01); *G06F 2119/12* (2020.01); *H03K 5/13* (2013.01)

(58) Field of Classification Search
USPC ........................................................ 716/113
See application file for complete search history.

(56) References Cited

U.S. PATENT DOCUMENTS

2005/0045919 A1    3/2005    Kaeriyama et al.
2007/0240091 A1*   10/2007   Vujkovic .............. G06F 30/327
                                                           716/113
(Continued)

FOREIGN PATENT DOCUMENTS

JP    2002-015024 A    1/2002
JP    2006-195820 A    7/2006
(Continued)

OTHER PUBLICATIONS

International Search Report for PCT Application No. PCT/JP2019/019137, dated Aug. 20, 2019.

*Primary Examiner* — Bryce M Aisaka
(74) *Attorney, Agent, or Firm* — Dority & Manning, P.A.

(57) ABSTRACT

A numerical information generating apparatus receives information of a programmable logic integrated circuit that includes a plurality of crossbar switches each including resistance change elements, calculates, for each of the plurality of crossbar switches, a base delay that is a delay in which influence of a load capacitance of other crossbar switch is excluded and a correction delay that is a delay caused by influence of a fanout of other crossbar switch, and further calculates a delay of each of the plurality of crossbar switches based on the base delay and the correction delay corresponding to each of the plurality of crossbar switches.

17 Claims, 12 Drawing Sheets

(51) Int. Cl.
*G06F 119/12* (2020.01)
*H03K 5/13* (2014.01)

(56) References Cited

U.S. PATENT DOCUMENTS

| | | | |
|---|---|---|---|
| 2009/0024973 | A1 | 1/2009 | Yamada |
| 2013/0181180 | A1 | 7/2013 | Tada et al. |
| 2019/0052273 | A1 | 2/2019 | Tada et al. |
| 2019/0334568 | A1* | 10/2019 | Gong .................... H03K 5/135 |

FOREIGN PATENT DOCUMENTS

| | | |
|---|---|---|
| JP | 2008-032633 A | 2/2008 |
| JP | 2009-025891 A | 2/2009 |
| JP | 4356542 B2 | 11/2009 |
| JP | 2012-169023 A | 9/2012 |
| WO | 2012/043502 A1 | 4/2012 |
| WO | 2017/038095 A1 | 3/2017 |

* cited by examiner

FIG. 5A

INTER-CLB WIRING RESISTANCE (Ω)

| Delay Error \ Total F/O | 10 | 20 | 30 | 70 | 100 | 200 | 300 | 700 | 1000 | 2000 |
|---|---|---|---|---|---|---|---|---|---|---|
| 5 | 0.5% | 0.7% | 0.8% | 0.8% | 1.3% | 2.5% | 3.3% | 8.6% | 12.0% | 20.0% |
| 6 | 0.6% | 0.9% | 1.0% | 1.8% | 2.4% | 4.2% | 6.4% | 16.1% | 23.5% | 39.0% |
| 7 | 0.9% | 1.1% | 1.3% | 2.7% | 3.4% | 6.2% | 9.0% | 23.2% | 34.1% | 57.6% |
| 9 | 1.4% | 1.9% | 2.0% | 3.5% | 4.8% | 9.0% | 13.8% | 36.1% | 54.1% | 93.3% |
| 10 | 1.4% | 1.9% | 2.4% | 4.2% | 5.5% | 10.1% | 15.5% | 41.9% | 63.7% | 110.8% |
| 11 | 1.7% | 2.0% | 2.8% | 4.5% | 6.0% | 11.2% | 17.4% | 47.3% | 73.4% | 127.9% |

FIG. 5B

INTRA-CLB WIRING RESISTANCE (Ω)

| Delay Error \ Total F/O | 10 | 20 | 30 | 70 | 100 | 200 | 300 | 700 | 1000 | 2000 |
|---|---|---|---|---|---|---|---|---|---|---|
| 5 | 0.0% | 0.5% | 0.5% | 0.5% | 0.6% | 1.1% | 1.6% | 3.3% | 4.7% | 8.9% |
| 6 | 0.0% | 0.5% | 0.4% | 0.8% | 1.3% | 1.9% | 2.8% | 6.2% | 8.8% | 16.9% |
| 7 | 0.0% | 0.8% | 0.9% | 1.3% | 1.6% | 2.6% | 3.8% | 8.8% | 12.4% | 24.3% |
| 9 | 0.0% | 1.2% | 1.1% | 2.0% | 2.4% | 4.2% | 5.9% | 13.0% | 18.5% | 37.4% |
| 10 | 0.0% | 1.2% | 1.4% | 2.2% | 2.5% | 4.7% | 6.7% | 14.9% | 21.2% | 43.5% |
| 11 | 0.0% | 1.4% | 1.5% | 2.2% | 3.0% | 4.9% | 7.2% | 16.3% | 23.6% | 49.2% |

NUMERICAL INFORMATION GENERATION APPARATUS, NUMERICAL INFORMATION GENERATION METHOD, AND PROGRAM

REFERENCE TO RELATED APPLICATION

This application is a National Stage Entry of PCT/JP2019/019137 filed on May 14, 2019, which claims priority from Japanese Patent Application 2018-093462 filed on May 15, 2018, the contents of all of which are incorporated herein by reference, in their entirety. The present invention relates to a numerical information generation apparatus, a numerical information generation method, and a program.

BACKGROUND

Field

A semiconductor integrated circuit is configured by including transistors formed on a semiconductor substrate and wiring structures formed on an upper layer of the semiconductor substrate for connecting the transistors. Transistors and wiring patterns are determined at a design stage of an integrated circuit, and it is impossible to change a connection between transistors after a semiconductor integrated circuit has been manufactured.

A programmable logic integrated circuit such as an FPGA (Field Programmable Gate Array) is enabled to change a logic operation and a wiring connection by having a memory store an operation of a logic operation circuit and a connection of the logic operation circuit. In a programmable logic integrated circuit such as an FPGA, an SRAM (Static Random Access Memory) cell, an anti-fuse, a floating gate MOS (Metal Oxide Semiconductor) transistor, or the like is used as a memory element storing configuration information.

These memory elements, since they are formed in the same layer as that where the transistors are formed, incurs a very large area overhead. As a result, there is a problem that a chip area of the programmable logic integrated circuit becomes large, which raises a manufacturing cost. Further, since an area for wiring switches which change connection between logic operation circuits becomes large, there is a problem that a ratio of an area of the logic operation circuit to a chip area becomes low. This decrease in usage efficiency causes a decrease in operation speed and an increase in operation power of circuits mounted on an FPGA.

For the purpose of enabling to change wiring connection configuration after manufacturing, enabling to repair a defect of a circuit and to change a specification after manufacturing, furthermore reducing a chip area and increasing a power performance ratio, a programmable logic integrated circuit which uses resistance change elements that can be formed on a wiring layer has been proposed.

For example, a programmable logic integrated circuit disclosed in Patent Literature (PTL) 1 and PTL 2 has a structure in which a resistance change element(s) formed by a solid electrolyte material containing metal ions is provided between a first wiring layer and a second wiring layer formed on the first wiring layer. A resistance value can be changed by applying a forward bias or a reverse bias to both ends of the resistance change element, and a ratio between a low resistance state (on state) and a high resistance state (off state) is 10 to the 5th power or more. That is, the resistance change element functions as a switch that can electrically connect or disconnect the first wiring and the second wiring.

Usually, in connection/disconnection of a wiring in a programmable logic integrated circuit, a switch cell constituted by a SRAM cell and one transistor having a switch function are used. On the other hand, the switch cell can be realized by one resistance change element since the resistance change element can realize the memory function and the switch function.

According to PTL 1, a crossbar switch circuit that can freely connect an arbitrary wiring in a first wiring group with an arbitrary wiring in a second wiring group can be configured in a very compact size by arranging a resistance change element at each intersection of the first wiring group and the second wiring group. As a result, it is expected that a chip area will be significantly reduced and a performance will be increased by improving a utilization efficiency of the logic operation circuit. Further, there is also an advantage that since an on/off state of a resistance change element is also maintained even in a state wherein a power supply to the integrated circuit is cut off, it is possible to save a trouble of loading circuit configuration information every time the programmable logic integrated circuit is powered on.

In a design of a semiconductor integrated circuit, usually, a logic specification is expressed using a hardware description language or the like, and based on the description a logic synthesis is performed using a design tool. A series of processes continues until a function and an operation speed of a circuit obtained by the logic synthesis are verified. It is mainstream to use static timing analysis (abbreviated as STA) for verification of an operation speed.

STA is a method which does not use a test pattern of a circuit operation but calculates delays of all signal propagation paths in the circuit and verifies whether it operates at a desired clock frequency. More specifically, all signal propagation paths (netlists) from a sequential circuit such as a D-type Flip-Flop (abbreviated as DFF) existing in the circuit to a next-stage sequential circuit are extracted. After that, a time (delay) for passing through the netlist is calculated. An operating frequency is obtained by determining whether or not the delay in each netlist violates conditions of a setup time and a hold time (timing constraints) of a sequential circuit in a final stage.

A netlist used in STA calculation has a connection from DFF1 to DFF2 via cells 1 to 5, for example, as illustrated in FIG. 9. The cells 1 to 5 are gate-level circuits including a power supply circuit and have information on logic, delay, and power. Hereinafter, cells such as DFF1 and 2 and the cells 1 to 5 are minimum unit circuits on the netlist for performing characterization such as STA verification or the like and are referred to as leaf cells. A delay when a signal propagates through the netlist in FIG. 9 is obtained by accumulating delays of the leaf cells of the DFF1 and up to the cells 1 to 5, and the calculation is performed as to whether or not a timing constraint of the DFF2 is satisfied (a summing method). A delay of the leaf cell, timing constraint, and power are obtained using a circuit simulator typified by spice (simulation program with integrated circuit emphasis). PTL1: Japanese Patent No. 4356542B PTL2: WO2012/043502A1

SUMMARY

The disclosures of the above-mentioned prior art documents are incorporated herein in its entirety by reference thereto. The following analysis has been made by the present inventors.

In ASIC (Application Specific Integrated Circuit) or the like, there are wide variety of connections between gate elements, and a resistance and capacitance of a connection wiring vary depending on each connection. Therefore, input and output capacitances are not constant, and a delay and a power of a leaf cell are expressed by a two-dimensional matrix by a combination of an input capacitance and an output capacitance. In order to obtain a calculated delay of a netlist by STA, it is necessary to calculate an input capacitance and an output capacitance for each leaf cell that constitutes the netlist, and development of such a tool requires a lot of man-hours.

As illustrated in FIG. 10A, an FPGA (Field Programmable Gate Array) is constituted by arranging Cell Logic Blocks 201 (abbreviated to CLB, also called Configurable Logic Blocks) in tiles (matrix) as illustrated in FIG. 10B, encompassing a logic block 202 that performs an operation, signal lines and a routing switch block 203 (also abbreviated as "switch block") that connects the signal lines. CLBs are connected by an inter-CLB wiring 204. In a programmable logic integrated circuit, a circuit that performs a desired operation can be obtained by setting a look-up table (LUT) (not shown) in the logic block 202 and a wiring connection in the switch block 203. Since a connection between the gate elements in the programmable logic integrated circuit is uniquely determined and a resistance and a capacitance of a inter-gate wiring is also constant, a delay can be obtained assuming that input and output capacitances of each gate element are constant. That is, in STA of a programmable logic integrated circuit, it is not necessary to calculate input/output capacitances due to a connection, and it is possible to use a tool which costs a relatively small development man-month.

On the other hand, in the case of the programmable logic integrated circuit using a resistance change element, it is needed to exercise some ingenuity. That is, since an output load capacitance varies depending on the number of resistance change elements in a switch block which are in an ON-state, it is necessary to prepare a leaf cell depending on a type of the output load. In a switch block using a resistance change element, a buffer is arranged in a stage subsequent to the resistance change element to rectify an output signal from the resistance change element in an ON state (the buffer may be configured by a voltage follower or the like). The delay is calculated by regarding the buffer as a power supply element (signal source), and regarding a wiring connected to an adjacent CLB and a resistance change element in a switch block connected to the wiring as a leaf cell for routing.

FIG. 11A illustrates an example of a crossbar switch using a resistance change element, which constitutes a switch block (203 in FIG. 10A). An unillustrated SMUX (Switch Multiplexer) in the switch block 203 (crossbar switch block) switches over a signal path between cell logic blocks CLBs. An unillustrated switch IMUX (Input Multiplexer) in the switch block (crossbar switch block) 203 switches over a signal input to an LUT in a logic block 202 as illustrated in FIG. 10A. FIG. 11A represents a 4×4 matrix configuration in which a resistance change element is arranged at each intersection of a wiring in0-3 in a first direction and a wiring out0-3 in a second direction orthogonal to the first direction. Assuming that a resistance change element located at (0, 0) is in an ON state (black square) and other resistance change elements are in an OFF state (hatched square), it represents a crossbar switch which outputs a signal transmitted from in0 to out0 through a resistance change element located at (0, 0). Each resistance change element has an equivalent circuit as illustrated in FIG. 11B. A resistance change element includes a resistance (variable resistance) R(NB) and a capacitance C(NB) connected to one end of the resistance. NB of R(NB) and C(NB) represents an ion conduction type switch NanoBridge (a registered trademark of NEC in Japan). The crossbar switch as illustrated in FIG. 11A has an equivalent circuit as illustrated in FIG. 11C. It is noted that in the equivalent circuit as illustrated in FIG. 11C, the variable resistance illustrated in FIG. 11B is represented by a resistance symbol in which an oblique arrow is omitted. Since a resistance change element in an OFF state has a resistance value of, for example, 10 to the 6-th power Ohm level, only a capacitance of a wiring and a resistance change element can be observed for each of the wirings out 1, 2, and 3 (which are represented capacitances C1-3 as illustrated in FIG. 11C). Further, regarding out0 via the resistance change element in the ON state, for example, a resistance of 10 to the third power level and a capacitance of the resistance change elements of (0, 1), (0, 2), (0, 3) and a wiring capacitance are observed (in FIG. 11C, it is represented by a capacitance C0 and a resistance R(NB)). It is noted that ON_NB represents a resistance change element in a ON state. A resistance change element is not limited to an ion conduction type and may be a resistance change element using a transition metal oxide.

FIG. 12 illustrates an example of a circuit configuration in which a buffer buf0 is a starting point in characterizing a crossbar switch SMUX in a routing switch block (i.e., preparation for constructing a delay information library including a delay and so forth for each unit circuit in order to perform static timing analysis). In FIG. 12, the buffer buf0 is located in the cell logic block CLB0 and transmits a signal via one resistance change element in the crossbar switch SMUX0 to an adjacent CLB. The buffer buf0 is treated as a power supply element for a CLB of a next stage. The crossbar switch SMUX0 has a structure with a segment length of 4 for transmitting a signal up to a cell logic block CLB3 which is four ahead. An output Seg1 of a crossbar switch SMUX1 of CLB1 of a next stage adjacent to CLB0 increases in accordance with the number of resistance change elements in an ON state. The number FO1 of the resistance change elements in the ON state is a fanout number (the number of input terminals of a plurality of subsequent circuits connected to one output terminal) of the CLB1 of a next stage adjacent to CLB0. The output capacitance of the CLB depends on the respective fanout numbers FO1 to FO4 of the crossbar switches SMUX1 to 4.

If a resistance between crossbar switches is small, a delay D1 of the output Seg1 of the crossbar switch SMUX1, a delay D2 of Seg2, a delay D3 of Seg3, and a delay D4 of Seg4 are D1÷D2÷D3÷D4. Therefore, each delay is a one-dimensional function of (FO1+FO2+FO3+FO4). However, in each inter-CLB wiring, there is a wiring resistance and a capacitance RC_CLB1 to 4, and a transmission gate TMG1 to 4 required for an FPGA using a resistance change element. It is necessary to arrange a transmission gate TMG as an element capable of producing a high impedance state (an off state of TMG) in a wiring connecting a switch block in each CLB in order to prevent a write voltage from being applied to a resistance change element of CLBs other than the CLB when a resistance change element of the CLB concerned is written. Since the transmission gate TMG has an on-resistance value of, for example, about 1 Id/(kiloohm), influence on the delay difference of Seg1 to 4 is large, and the delay values of the outputs Seg1 to 4 of the crossbar switches SMUX1 to 4 do not become the same.

Therefore, the delays D1 to 4 of the outputs Seg1 to 4 of each of the crossbar switches SMUX1 to 4 need to be obtained for combinations of variables under the condition where respective fanout numbers FO1 to FO4 of the SMUX1 to 4 are independent. The number of combinations increases as a maximum output number of a crossbar switch increases and as a segment length of which the buffer is in charge becomes longer. For example, assuming that the maximum number of outputs of each crossbar switch SMUX1 to 4 is 32, the delays D1 to 4 of the buffer buf0 become 32×32×32×32=1,048,576 combinations in the circuit configuration of FIG. 12. Therefore, it takes too much time to characterize the crossbar switch.

The present invention has been devised in view of the above circumstances, and it is a main object of the present invention to provide a numerical information generating apparatus, a numerical information generating method, and a program that contribute to reduction in the number of man-hour for characterizing a crossbar switch including a resistant change element.

Solution to Problem

According to a first aspect of the present disclosure, there is provided a numerical information generation apparatus that includes: an input part that receives information of a programmable logic integrated circuit that includes a plurality of crossbar switches, each including resistance change elements; and a calculation part that calculates, for each of the plurality of crossbar switches, a base delay that is a delay in which influence of a load capacitance of other crossbar switch is excluded and a correction delay that is a delay caused by influence of a fanout of other crossbar switch, wherein the calculation part calculates a delay of each of the plurality of crossbar switches, based on the base delay and the correction delay, corresponding to each of the plurality of crossbar switches.

According to a second aspect of the present disclosure, there is provided a numerical information generation method using a computer, the method comprising:
receiving information of a programmable logic integrated circuit that includes a plurality of crossbar switches, each including resistance change elements;
calculating, for each of the plurality of crossbar switches, a base delay that is a delay in which influence of a load capacitance of other crossbar switch is excluded and a correction delay that is a delay caused by influence of a fanout of other crossbar switch; and
calculating a delay of each of the plurality of crossbar switches based on the base delay and the correction delay, corresponding to each of the plurality of crossbar switches.

According to a third aspect of the present disclosure, there is provided a program causing a computer to execute processing comprising:
receiving information of a programmable logic integrated circuit that includes a plurality of crossbar switches including resistance change elements;
calculating, for each of the plurality of crossbar switches, a base delay that is a delay in which influence of a load capacitance of other crossbar switch is excluded and a correction delay that is a delay caused by influence of a fanout of other crossbar switch; and
calculating a delay of each of the plurality of crossbar switches based on the base delay and the correction delay corresponding to each of the plurality of crossbar switches.

According to the present disclosure, there is provided a computer readable storage medium on which the program is recorded. The storage medium can be non-transient such as a semiconductor memory, a hard disk, a magnetic recording medium, an optical recording medium, and so on. The present invention can be realized as a computer program product.

According to each aspect of the present disclosure, there is provided a numerical information generating apparatus, a numerical information generating method, and a program that contribute to reduction in the number of man-hour for characterizing a crossbar switch formed by a resistant change element.

BRIEF DESCRIPTION OF DRAWINGS

FIGS. 5A and 5B illustrate an example of a maximum difference of delays D1 to D4 for a summing method in the first example embodiment.

DETAILED DESCRIPTION

Figure 1:
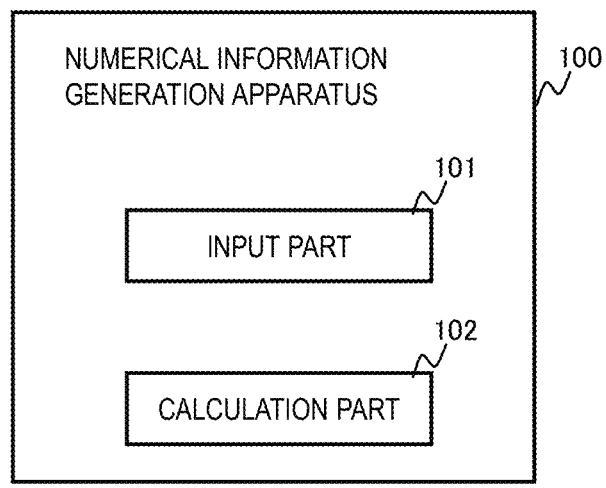
FIG. 1 is a diagram illustrating an outline of an example embodiment.

First, an outline of example embodiments will be described. In the following outline, reference signs of the drawings are denoted to each element for the sake of convenience to facilitate understanding and the descriptions of the outline are not intended to limit the present invention. Further, connection lines between blocks in the drawings include both bidirectional and unidirectional. The one-way arrow schematically shows the flow of a main signal (data), and it does not exclude bidirectionality. Input ports and output ports are respectively provided at input terminals and output terminals for each connection line in a circuit diagrams, block diagrams, internal configuration diagrams and connection diagrams of the present disclosure, but they are not explicitly shown. The same applies to the input/output interfaces.

A numerical information generation apparatus 100 according to an example embodiment includes an input part 101 and a calculation part 102 (see FIG. 1). The input part 101 receives information of a programmable logic integrated circuit that includes a plurality of crossbar switches, each including resistance change elements. The calculation part 102 calculates, for each of the plurality of crossbar switches, a base delay that is a delay in which influence of load capacitance(s) of other crossbar switch(es) is excluded and a correction delay that is a delay caused by influence of a fanout(s) of other crossbar switch(es). Furthermore, the calculation part 102 calculates the delay of each of the plurality of crossbar switches based on the base delay and the correction delay corresponding to each of the plurality of crossbar switches.

In a programmable logic integrated circuit using resistance change elements, the numerical information generating apparatus 100 changes over a generation method of a leaf cell that is calculated in a netlist on which STA calculation is performed, depending on a resistance between the crossbar switches. More specifically, when it is determined that a resistance between the crossbar switches greatly affects a delay of the crossbar switches such that a calculated delay error is unacceptable, the numerical information generating apparatus 100 employs a delay calculation method using a base delay and a correction delay. Instead of calculating a vast number of combinations due to the fanout number in each crossbar switch, the delay calculation method using the base delay and the correction delay, reduces a necessary amount of calculation, by paying attention to a nature of a delay that occurs in each crossbar switch. More specifically, a delay in each crossbar switch can be separated into a delay (base delay) caused by influence of a fanout of each crossbar switch itself, and a delay(s) (correction delay(s)) affected by fanout(s) of other crossbar switch(es). The sum of respective delays (base delay+correction delay(s)) is calculated as a delay of each crossbar switch. As a result, the man-hour for characterizing the crossbar switches involved in routing of a programmable logic integrated circuit using resistance change elements with highly diversified output capacitances, is reduced while suppressing an error.

Hereinafter, specific example embodiments will be described in more detail with reference to the drawings. In each of example embodiments, the same elements are denoted by the same reference numerals, and the description thereof will be omitted as appropriate.

First Example Embodiment

Next, a first example embodiment will be described in detail with reference to the drawings.

Figure 2:
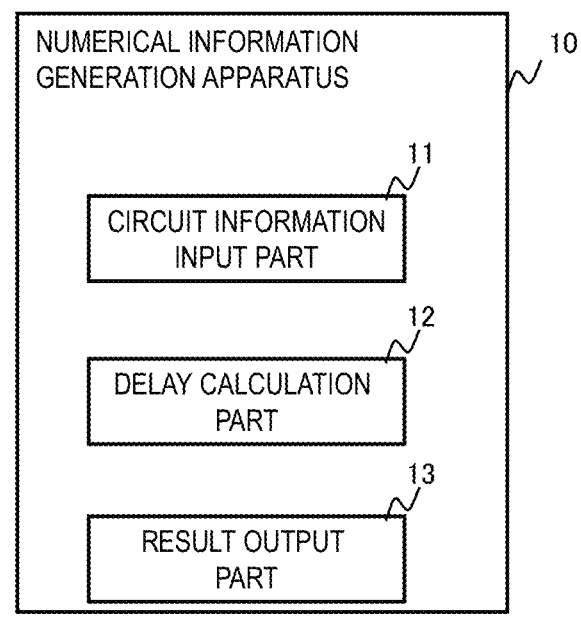
FIG. 2 is a diagram illustrating an example of a processing configuration of a numerical information generation apparatus of a first example embodiment.

FIG. 2 is a diagram illustrating an example of a processing configuration (processing module) of a numerical information generation apparatus 10 of the first example embodiment. Referring to FIG. 2, the numerical information generation apparatus 10 is configured to include a circuit information input part 11, a delay calculation part 12, and a result output part 13.

Figure 12:
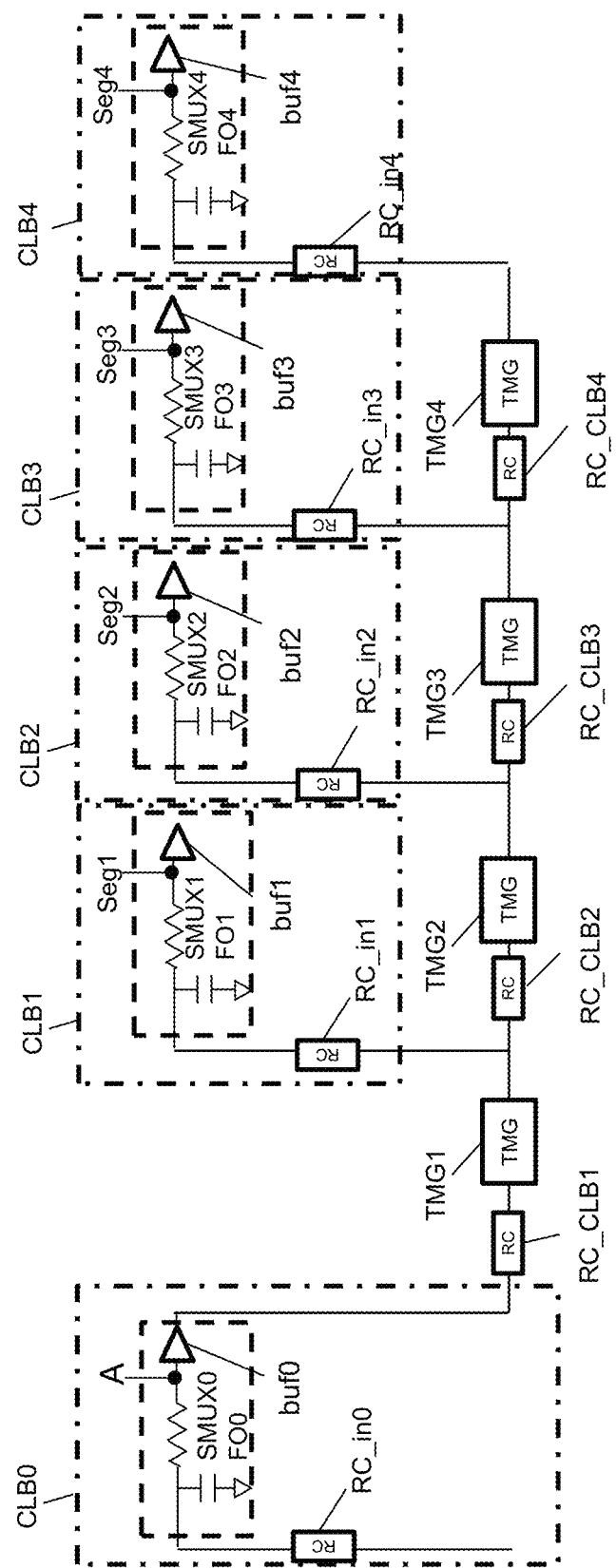
FIG. 12 is a diagram illustrating an example of a circuit for calculating a leaf cell of a switch block for which a buffer buf0 is a starting point.

The circuit information input part 11 receives a netlist of a circuit (a circuit to be characterized) for which numerical information is calculated. More specifically, the circuit information input part 11 receives circuit information of a programmable logic integrated circuit including a plurality of crossbar switches, each including resistance change elements. The circuit information input part 11 obtains circuit information as illustrated in FIG. 12, for example.

The delay calculation part 12 calculates a delay of each of the plurality of crossbar switches. The operation of the delay calculation part 12 will be described later. In the numerical information generation apparatus 10, regarding characterization of a circuit of a crossbar switch, information other than a delay is calculated by using any existing (known) technique. Description of the technique is omitted because it is not directly related to practicing of the present disclosure and is evident to those skilled in the art.

The result output part 13 is a means for outputting a calculation result (delay information) by the delay calculation part 12 to outside. For example, the result output part 13 may print the calculation result, display it on a liquid crystal panel or the like, or write it to an external device such as a USB (Universal Serial Bus) memory.

Figure 3:
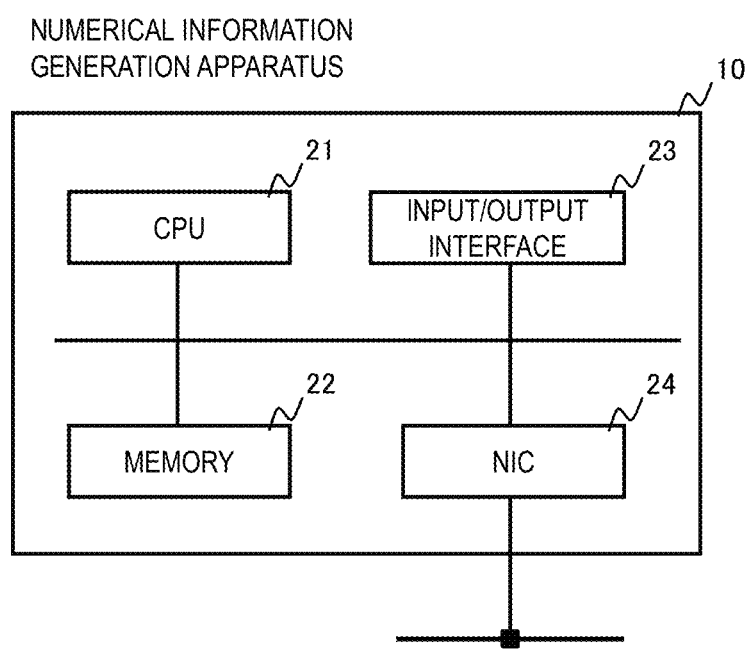
FIG. 3 is a diagram illustrating an example of a hardware configuration of a numerical information generation apparatus of the first example embodiment.

Next, a hardware configuration of the numerical information generation apparatus 10 according to the first example embodiment will be described. FIG. 3 is a diagram illustrating an example of a hardware configuration of the numerical information generation apparatus 10. The numerical information generation apparatus 10 is implemented by a so-called information processing apparatus (computer) and has the configuration illustrated in FIG. 3. For example, the numerical information generation apparatus 10 includes a CPU (Central Processing Unit) 21, a memory 22, an input/output interface 23, a NIC (Network Interface Card) 24 that is a communication means, and the like, which are mutually connected by an internal bus.

The configuration illustrated in FIG. 3 is not intended to limit the hardware configuration of the numerical information generation apparatus 10. The numerical information generation apparatus 10 may include unillustrated hardware and may not include the NIC 24 or the like depending on the necessity.

The memory 22 includes at least any one of RAM (Random Access Memory), ROM (Read Only Memory), HDD (Hard Disk Drive), and the like.

The input/output interface 23 is a means that serves as an unillustrated interface of an input/output device. The input/output device includes, for example, a display device and an operation device, or the like. The display device is, for example, a liquid crystal display or the like. The operation device is, for example, a keyboard or a mouse, or the like.

Each processing module of the numerical information generation apparatus 10 described above is implemented, for example, by having the CPU 21 execute a program stored in the memory 22. In addition, the program can be downloaded via a network or updated using a storage medium storing the program. Furthermore, the processing module may be realized by a semiconductor chip. That is, it is sufficient that there is a means for executing, with some kind of hardware and/or software, the function performed by the processing module.

Next, the relationship between the fanout number of CLB and a delay of the crossbar switch will be described.

Figure 4:
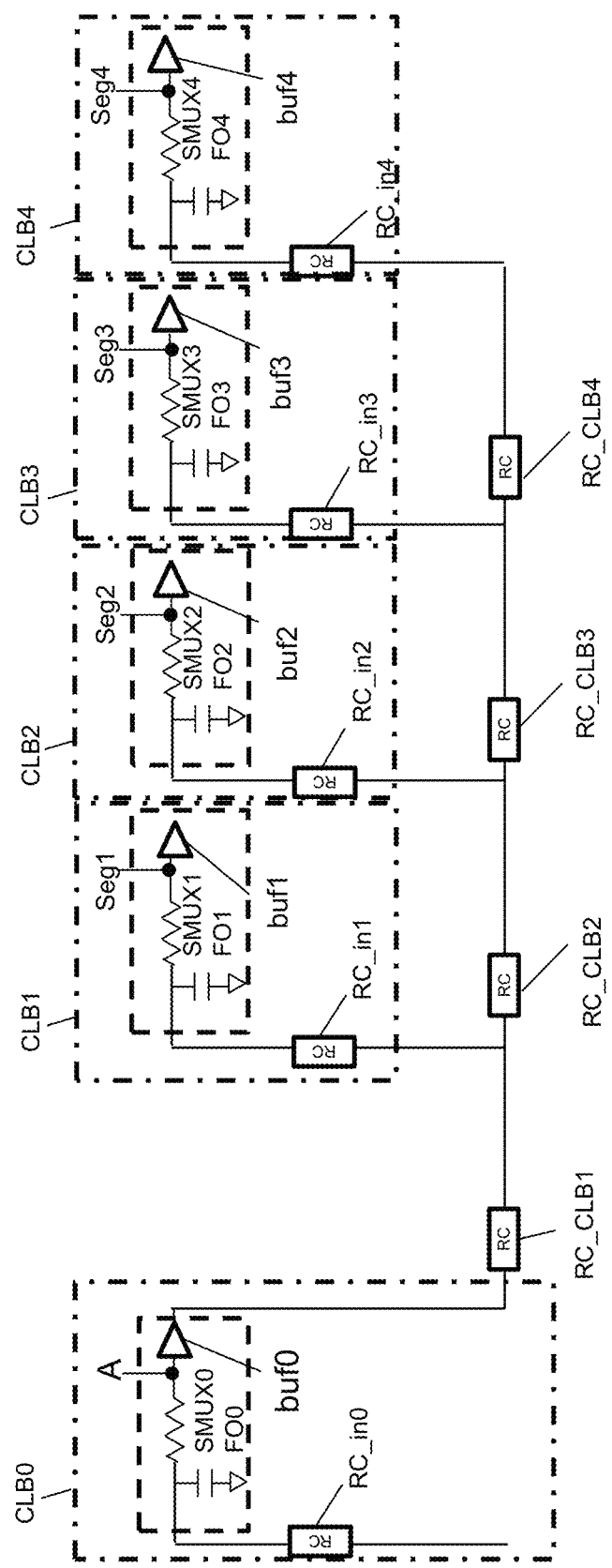
FIG. 4 is a diagram illustrating the first example embodiment and indicates an example of a circuit for calculating a leaf cell of a switch block for which a buffer buf0 is a starting point.

FIG. 4 is a diagram illustrating an example of a circuit characterizing a crossbar switch (switch block) for which a buffer buf0 is a starting point. In FIG. 4, a buffer buf0 located in a cell logic block CLB0 transmits a signal that passes through one resistance change element in the crossbar switch SMUX0 and is connected to crossbar switches SMUX1 to 4 located in cell logic blocks CLB1 to 4 respectively. The crossbar switches SMUX0 to 4 are switch blocks including resistance change elements and perform switching over connections of wirings by resistance states of the resistance change elements. The number of each of outputs Seg1 to 4 of the crossbar switches SMUX1 to 4 of respective CLBs increases equally to the number of resistance change elements in the ON state, and the number of resistance change elements in the ON state FO1 to FO4 becomes the fanout number of the crossbar switches.

$$\text{Total } F/O = FO1 + FO2 + FO3 + FO4 \quad (1)$$

In the following description, the total sum of fanouts in SMUX1 to 4 is denoted as Total F/O as in the above expression (1). Further, delays of the outputs Seg1 to 4 of the SMUX1 to 4 are denoted as D1, D2, D3 and D4, respectively.

FIGS. 5A and 5B illustrate a diagram for explaining the maximum error (%) of the delays D1 to D4 in the summing method. Inter-CLB resistances RC_CLB1 to 4, intra-CLB resistances RC_in1 to 4 in FIG. 4 and as an effect of a Total F/O affecting the delay, the maximum differences (%) of the delays D1 to D4 are shown in the case where the Total F/O matches in FIG. 5A and FIG. 5B.

FIG. 5A shows an error regarding a delay in the case where inter-CLB resistances are respectively varied. FIG. 5B shows errors regarding delays in the case where intra-CLB resistances are respectively varied. The maximum difference (%) is an error when the delay is calculated as a function of Total F/O. In a process for manufacturing a semiconductor integrated circuit, by taking a consideration of variations such as, for example, manufacturing lots, a threshold value of a transistor between chips and interlayer film thickness, a delay variation of 5% is considered to be an acceptable range. Accordingly, in the present example embodiment, the delay error is assumed to be set within 5% when characterizing a crossbar switch. That is, an error in characterizing a crossbar switch is assumed to be acceptable up to 5%.

Figure 6:
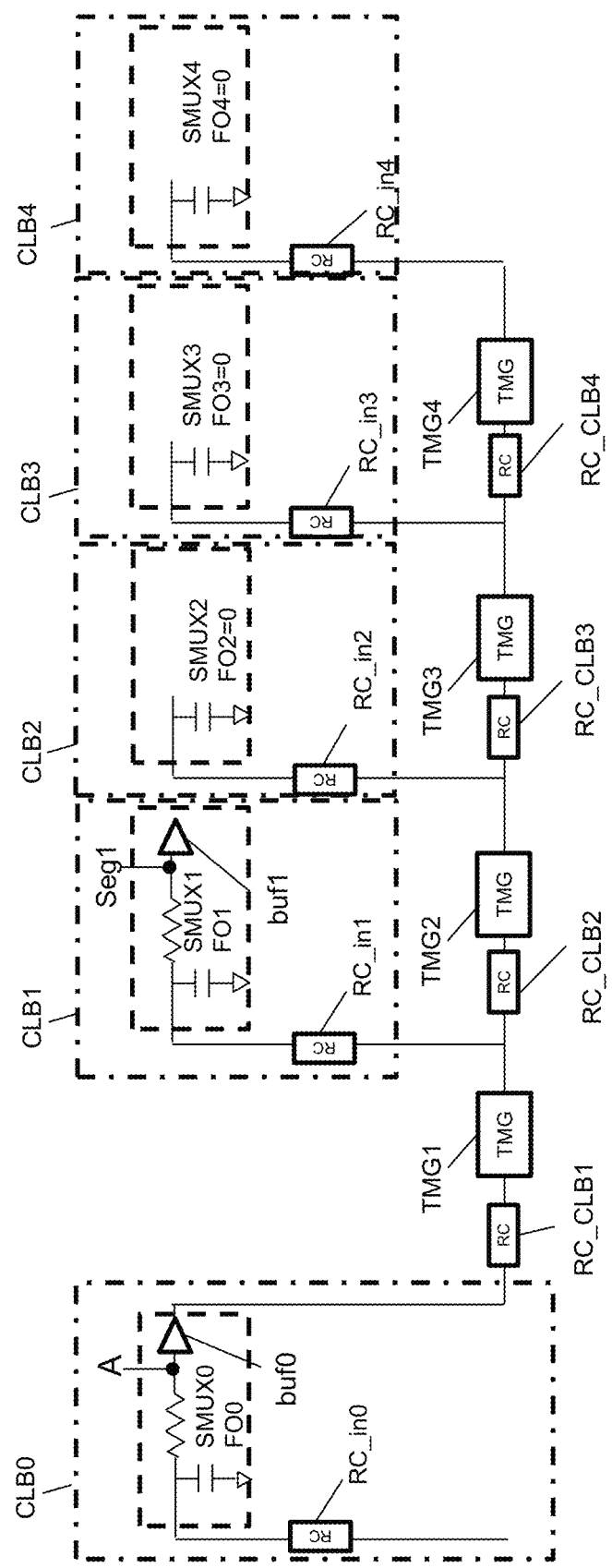
FIG. 6 is a diagram illustrating the first example embodiment and an example of a circuit for obtaining a base delay D_Seg1 of CLB1.

In FIGS. 5A and 5B, a range where the total F/O is large and a wiring resistance is large is a region where the delay error is 5% or more (a dark gray region in FIGS. 5A and 5B). Here, transmission gates required for a programmable logic integrated circuit using resistance change elements are arranged as illustrated in FIG. 6 (TMGs 1 to 4 in the figure). In this case, since the transmission gates TMG1 to TMG4 have an on-resistance value of about 1 kΩ, an inter-CLB wiring resistance is more than or equal to 1000Ω. According to FIG. 5A, the delay error is more than or equal to 5% for the inter-CLB wiring resistance of more than or equal to 1000Ω and for any of the Total F/Os (5 to 11). Therefore, when the delays D1 to D4 are calculated by the summing method, the acceptable error (e.g., 5%) cannot be satisfied.

Therefore, in the first example embodiment, the delays D1 to D4 are obtained by the method described below. Since the intra-CLB wiring resistance becomes less than or equal to 100Ω, an output from the same CLB may use a delay for which a variable is a sum of the fanouts in the CLB. Further, the crossbar switch in this case is assumed to have wiring of 32 columns in the vertical direction and 32 rows in the horizontal direction and have a structure in which a resistance change element is arranged at each intersection. It is noted that the wiring structure of the crossbar switch, as a matter of course, is not limited to the above (32 columns×32 rows).

Next, details of the operation of the delay calculation part 12 will be described.

The delay calculation part 12 calculates a base delay that is a delay in which influence of load capacitances of other crossbar switches is excluded and a correction delay that is a delay caused by influence of fanouts of other crossbar switches, for each of the plurality of crossbar switches. Then, the delay calculation part 12 calculates the delay of each of the plurality of crossbar switches based on the corresponding base delay and the corresponding correction delay.

At that time, the delay calculation part 12 switches over a generation method of a leaf cell that is calculated in a netlist for which a static timing analysis is executed, depending on a resistance between a plurality of crossbar switches. Specifically, the delay calculation part 12 switches over the method for calculating the delay of the crossbar switch, depending on the total fanout number and the resistance value of the inter-CLB wiring.

For example, when a delay error of a crossbar switch is large (e.g., when a delay error exceeds 5%) due to a total fanout number of and a resistance value of an inter-CLB wiring, the delay calculation part 12 calculates a delay using a method described below (the method using the base delay and the correction delay). On the other hand, when a delay error of a crossbar switch is assumed to be small (e.g., when a delay error is less or equal to 5%), the delay calculation part 12 calculates a delay by the above described summing method. Information regarding total fanout, inter-CLB wiring resistance, and delay error, as shown in FIG. 5A, is stored in advance within the numerical information generation apparatus 10 and is configured so that the delay calculation part 12 can refer thereto.

Here, the following description will be made assuming that the delay calculation part 12 calculates a delay of a crossbar switch of a circuit shown in FIG. 6. In particular, the delay calculation part 12 calculates delays of the crossbar switches SMUX1 to 4 to which power (transmission of a signal) is supplied from one active element (buffer buf0 of CLB0; buffer circuit in the example of FIG. 6).

In FIG. 6, transmission gates TMG (TMG1 to 4) which are elements capable of keeping a high impedance state are provided between the crossbar switches (SMUX0 and 1, SMUX1 and 2, SMUX2 and 3, SMUX3 and 4). As described above, since an on-resistance value of a transmission gate TMG is more than or equal to 1000Ω, a delay error exceeds a reference (5%) regardless of the total fanout number according to FIG. 5A. Therefore, the delay calculation part 12 calculates a delay of a crossbar switch by the following method without using the summing method.

First, the delay calculation part 12 obtains the base delay D_Seg1 of the output Seg1 in the cell logic block CLB1 including the crossbar switch to be characterized. The base delay D_Seg is a delay at the output Seg of a crossbar switch as a result of eliminating influence of load capacitances of crossbar switches arranged in other cell logic blocks CLBs as described above.

As illustrated in FIG. 6, the delay calculating part 12 sets fanouts of cell logic blocks CLB2-4 to: FO2=FO3=FO4=0 and performs a simulation (calculation of a delay using spice or the like) while changing the fanout FO1 in the cell logic block CLB1 from 1 to 32. In the following description, since the fanout FO1 is used as a variable, the base delay of the cell logic block CLB1 is described as D_Seg1(FO1). Similarly, the delay calculation part 12 obtains the base delay D_Seg2 (FO2) of the cell logic block CLB2 by setting fanouts of the cell logic blocks CLB1, 3 and 4 to: FO1=FO3=FO4=0 and by changing the fanout: FO2 in the cell logic block CLB2 from 1 to 32. Similarly, the delay calculation part 12 obtains the base delay D_Seg3 (FO3) of the cell logic block CLB3 by setting fanouts of the cell logic blocks CLB1, 2 and 4 to: FO1=FO2=FO4=0 and by changing the fanout: FO3 in the cell logic block CLB3 from 1 to 32. The delay calculation part 12 obtains the base delay D_Seg4 (FO4) of the cell logic block CLB4 by setting fanouts of the cell logic blocks CLB1-3 to: FO1=FO2=FO3=0 and by changing the fanout: FO4 in the cell logic block CLB4 from 1 to 32.

Next, the delay calculation part 12 obtains a correction delay at each cell logic block CLB. The correction delay is a delay caused by the influence of the fanouts of the crossbar switches arranged in other cell logic blocks CLBs as described above.

For example, when the number of resistance change elements in the ON state of the crossbar switch SMUX1 is FO1=x, the capacitance and resistance of the crossbar switch SMUX1 affects not only the delay D1 of the cell logic block CLB1 but also the delays of D2, D3, and D4 of the cell logic blocks CLB2, 3 and 4, respectively. Therefore, the delay calculation part 12 sets the fanouts of the cell logic block CLB2-4 to: FO2=FO3=FO4=1, and calculates delays D1_1 (FO1), D2_1(FO1), D3_1(FO1), D4_1(FO1) while changing the fanout: FO1 in the cell logic block CLB1 from 1 to 32. When the number of resistance change elements in the ON state of the crossbar switch SMUX1 is FO1=x, a correction delay $\Delta D\_seg2$ (FO1=x) of the delay D2 related to FO1 is obtained according to the expression (2) (x is 0 to 32).

$$\Delta D\_seg2(FO1{=}x){=}D2\_1(FO1{=}x){-}D2\_1(FO1{=}0) \quad (2)$$

Similarly, when the number of resistance change elements in the ON state of the crossbar switch SMUX1 is FO1=x (x is 0 to 32), correction delays $\Delta D\_seg3$ (FO1=x) and $\Delta D\_seg4$ (FO1=x) related to FO1 are respectively calculated according to expressions (3) and (4).

$$\Delta D\_seg3(FO1{=}x){=}D3\_1(FO1{=}x){-}D3\_1(FO1{=}0) \quad (3)$$

$$\Delta D\_seg4(FO1{=}x){=}D4\_1(FO1{=}x){-}D4\_1(FO1{=}0) \quad (4)$$

Further, when the number of resistance change elements in the ON state of a crossbar switch SMUX2 is FO2=x (x is 0 to 32), correction delays $\Delta D\_seg1$(FO2=x), $\Delta D\_seg3$ (FO2=x) and $\Delta D\_seg4$ (FO2=x) which a capacitance and a resistance of the SMUX2 bring about to the delays D1, D3 and D4 are calculated according to expressions (5), (6) and (7), respectively.

$$\Delta D\_seg1(FO2{=}x){=}D1\_1(FO2{=}x){-}D1\_1(FO2{=}0) \quad (5)$$

$$\Delta D\_seg3(FO2{=}x){=}D3\_1(FO2{=}x){-}D3\_1(FO2{=}0) \quad (6)$$

$$\Delta D\_seg4(FO2{=}x){=}D4\_1(FO2{=}x){-}D4\_1(FO2{=}0) \quad (7)$$

When the number of resistance change elements in the ON state of a crossbar switch SMUX3 is FO3=x (x is 0 to 32), correction delays $\Delta D\_seg1$(FO3=x), $\Delta D\_seg2$(FO3=x) and $\Delta D\_seg4$(FO3=x) which a capacitance and a resistance of the SMUX3 bring about to the delays D1, D2 and D4 are calculated according to expressions (8), (9), and 10), respectively.

$$\Delta D\_seg1(FO3{=}x){=}D1\_1(FO3{=}x){-}D1\_1(FO3{=}0) \quad (8)$$

$$\Delta D\_seg2(FO3{=}x){=}D2\_1(FO3{=}x){-}D2\_1(FO3{=}0) \quad (9)$$

$$\Delta D\_seg4(FO3{=}x){=}D4\_1(FO3{=}x){-}D4\_1(FO3{=}0) \quad (10)$$

When the number of resistance change elements in the ON state of a crossbar switch SMUX4 is FO4=x, correction delays $\Delta D\_seg1$(FO4=x), $\Delta D\_seg2$(FO4=x) and $\Delta D\_seg3$ (FO4=x) which a capacitance and a resistance of the SMUX4 bring about to the delays D1, D2 and D3 are calculated according to expressions (11), (12), and 13), respectively.

$$\Delta D\_seg1(FO4{=}x){=}D1\_1(FO4{=}x){-}D1\_1(FO4{=}0) \quad (11)$$

$$\Delta D\_seg2(FO4{=}x){=}D2\_1(FO4{=}x){-}D2\_1(FO4{=}0) \quad (12)$$

$$\Delta D\_seg3(FO4{=}x){=}D3\_1(FO4{=}x){-}D3\_1(FO4{=}0) \quad (13)$$

In the above description, the fanout number of each crossbar switch SMUX is set to "1" when calculating a correction delay, but the fanout number is just an example, and the fanout number used for calculating the correction delay is not intended to be limited thereto. For example, in the case where the fanout number of a leaf cells of a base delay is small, an error of the leaf cells of a correction delay becomes small when the fanout number of each crossbar switch SMUX is set small. Therefore, the delay calculation part 12 first sets a fanout number of a crossbar switch SMUX to be small (e.g., FO2=FO3=FO4=1), and if an error of a characterization result falls within a predetermined range (e.g., within 5%), delay information according to the fan-out number set in small is used. If the error does not fall within the predetermined range, the delay calculation part 12 sets the fanout number of each crossbar switch SMUX to be large (e.g., FO2=FO3=FO4=4) and then calculates the correction delay and verifies whether or not the error is within the predetermined range. The delay calculation part 12 calculates an appropriate correction delay by repeating such processing.

According to the above calculation, the delay calculation unit 12 can obtain delays D1, D2, D3 and D4 as the sum of a base delay and a correction delay(s) according to the expressions (14), (15), (16) and (17).

$$D1{=}D\_Seg1(FO1){+}\Delta D\_seg1(FO2){+}0\ \Delta D\_seg1(FO3){+}\Delta D\_seg1(FO4) \quad (14)$$

$$D2{=}D\_Seg2(FO2){+}\Delta D\_seg2(FO1){+}\Delta D\_seg2(FO3){+}\Delta D\_seg2(FO4) \quad (15)$$

$$D3{=}D\_Seg3(FO3){+}\Delta D\_seg3(FO1){+}\Delta D\_seg3(FO2){+}\Delta D\_seg3(FO4) \quad (16)$$

$$D4{=}D\_Seg4(FO4){+}\Delta D\_seg4(FO1){+}\Delta D\_seg4(FO2){+}\Delta D\_seg4(FO3) \quad (17)$$

The delay calculation part 12 passes the calculation results regarding the above expressions (14) to (17) to the result output part 13 as delay information D1-4 of each crossbar switch SMUX1-4 as illustrated in FIG. 6. The delay information is output from the result output part 13.

Figure 8:
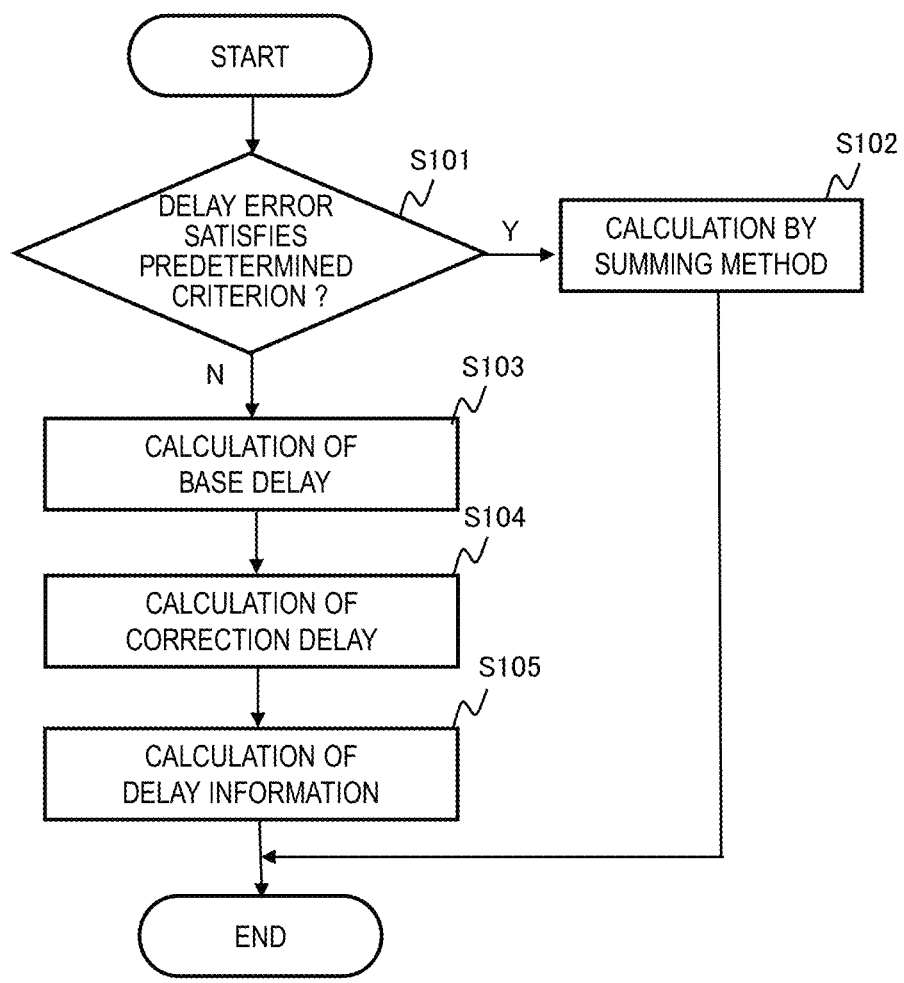
FIG. 8 is a flow chart illustrating an example of an operation of a delay calculation part of the first example embodiment.
Figure 9:
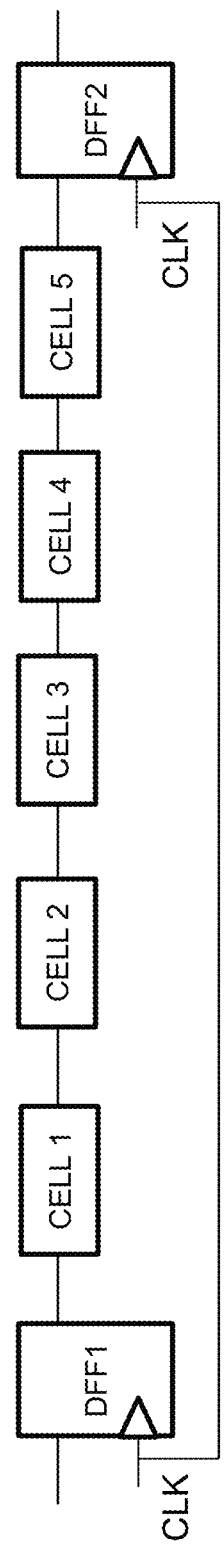
FIG. 9 is a diagram illustrating an example of a netlist for STA calculation.
Figure 10A:
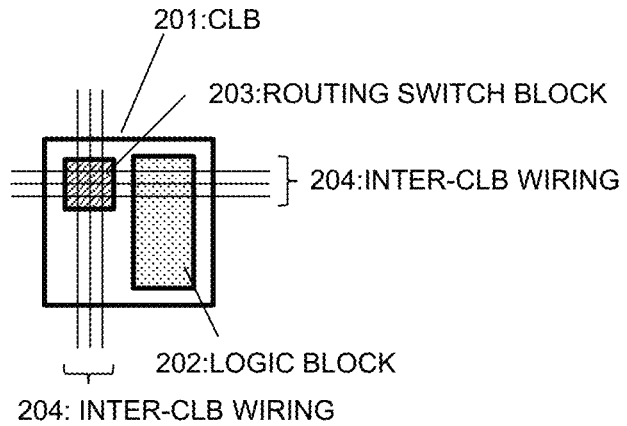
FIGS. 10A and 10B are diagrams illustrating an example of a cell logic block and a programable logic integrated circuit in which a plurality of cell logic blocks are arranged.
Figure 10B:
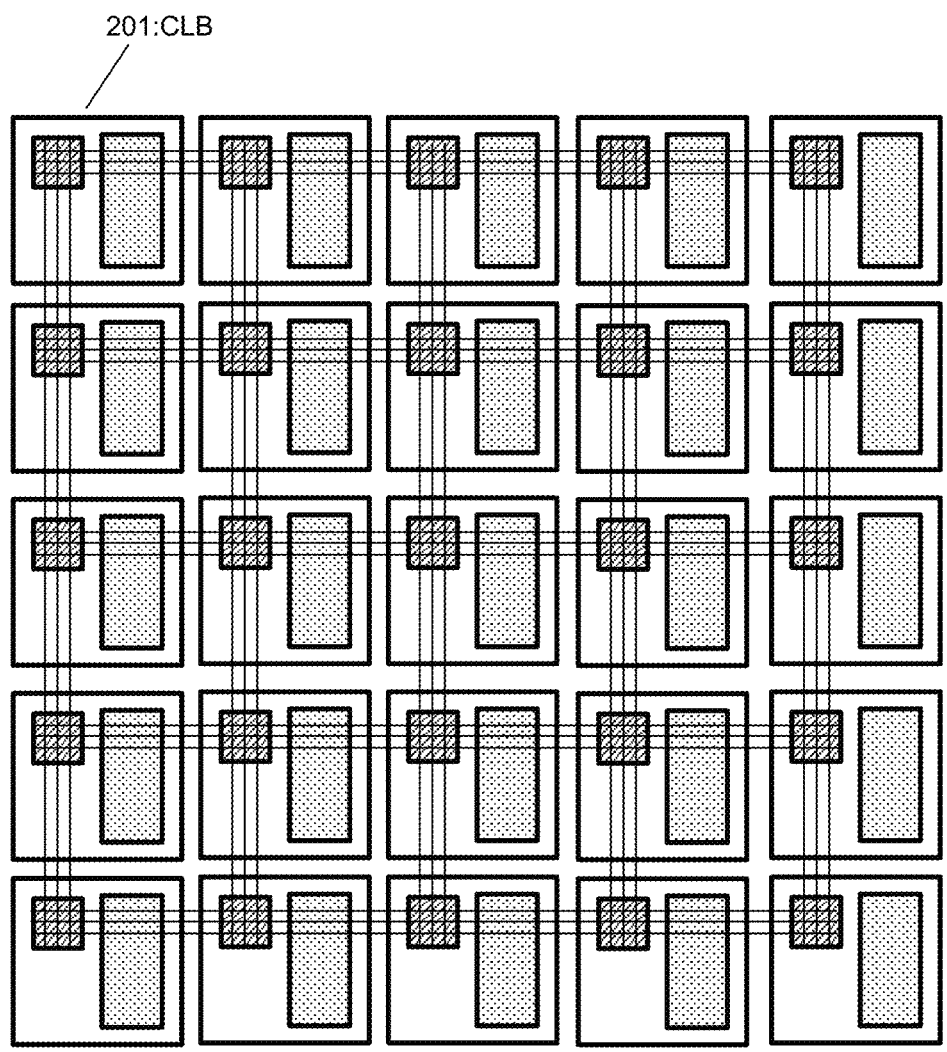
Figure 11A:
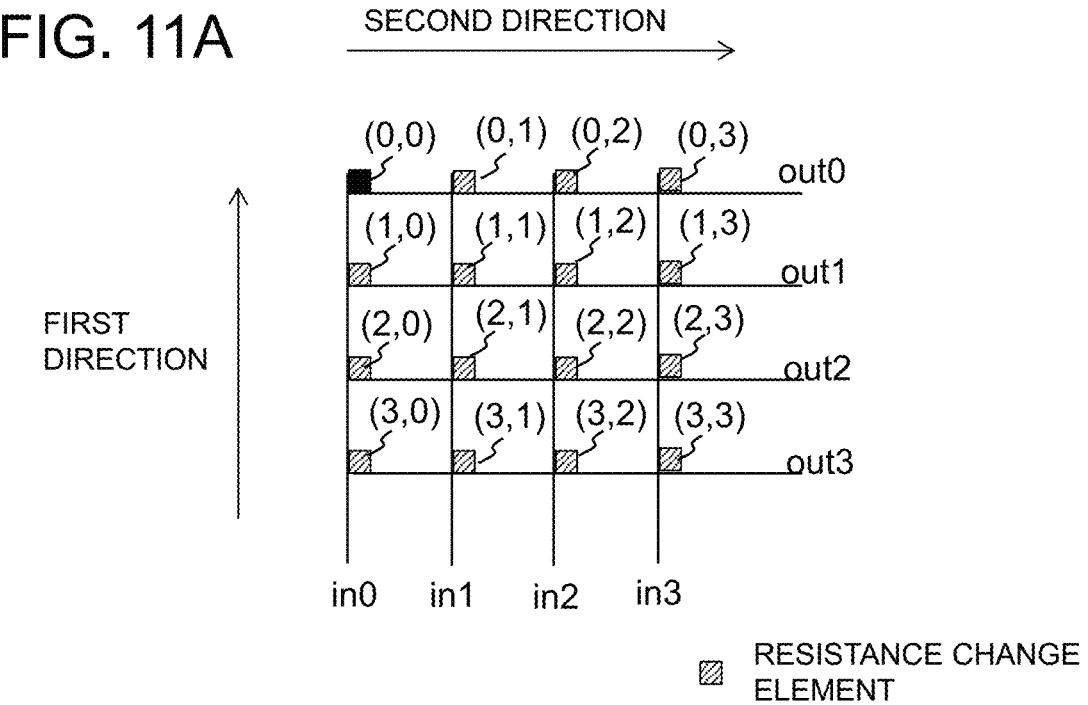
FIG. 11A is a diagram illustrating an example of a crossbar switch formulating a programable reconfigurable logic integrated circuit, FIG. 11B illustrate an equivalent circuit of a resistance change element.
Figure 11B:
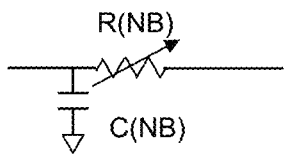
FIG. 11C is a diagram illustrating an equivalent circuit of the crossbar switch of FIG. 11A.
Figure 11C:
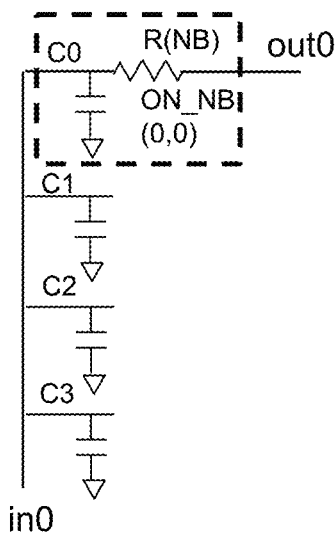

The operation of the delay calculation part 12 is summarized as illustrated in a flowchart of FIG. 8.

First, the delay calculation part 12 refers to the information as illustrated in FIG. 5 and determines whether or not a delay error estimated from a total fanout number and an inter-CLB wiring resistance value satisfies a criterion (e.g., 5%) (step S101). If the criterion is satisfied (step S101, Yes branch), the delay calculation part 12 calculates delay information of a crossbar switch by the existing summing method (step S102).

If the delay error does not satisfy the criterion (step S101, No branch), the delay calculation part 12 calculates a base delay (step S103). Next, the delay calculation part 12 calculates a correction delay (step S104) and calculates a delay information of the crossbar switch based on the base delay and the correction delay (step S105).

In this way, the delay calculation part 12 switches over a generation method of a leaf cell that is calculated in a netlist used when executing a static timing analysis, based on the resistance value between a plurality of crossbar switches and a sum of the fanout numbers of each of a plurality of crossbar switches.

Figure 7:
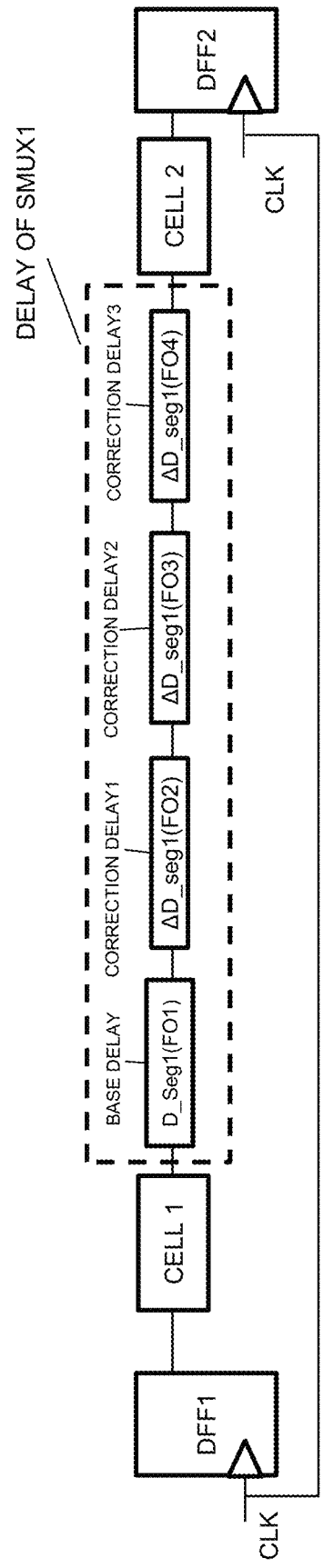
FIG. 7 is a diagram illustrating the first example embodiment and an example of a netlist for STA calculation including a crossbar switch SMUX1.

Here, for example, the expression (14) indicates that a delay D1 of the crossbar switch SMUX1 can be described (represented) as a netlist for STA calculation as illustrated in FIG. 7. It is noted that FIG. 7 illustrates a netlist for calculating a path from the cell 1 through the buffer buf0 and the crossbar switch SMUX1. There are four crossbar switches, SMUX1 to 4, to which a signal from the buffer buf0 propagates. and when each crossbar switch has an output, a leaf cell as a base delay and leaf cells having logic of three buffers of correction delays 1 to 3 are generated. That is, the delay calculation part 12 generates a leaf cell corresponding to the base delay and also generates leaf cells corresponding to the correction delays as leaf cells subordinate to the leaf cell corresponding to the base delay in the netlist (on the propagation path).

In the above example, as the leaf cells of the base delay, each of D_seg1, D_seg2, D_Seg3, and D_Seg4 has 32 types resulting in 32×4=128 types. The correction delay leaf cells ΔD_seg1 to be generated in the path passing through the crossbar switch SMUX1 are 32×3=96 types because there are 32 types of leaf cells depending on FO2, FO3 and FO4, respectively. Similarly, each of the correction delay leaf cells ΔD_seg2, ΔD_seg3, and ΔD_seg4 to be generated in the path passing through the crossbar switches SMUX2, SMUX3 and SMUX4 are 96 types, and the correction delay leaf cells are 96×4=384 types in total.

Therefore, the number of leaf cells related to routing is 128+384=512, and it is possible to be greatly reduced by using the method of the present example embodiment. The method of the present example embodiment can be used, regardless of the switch blocks which are being in charge of by each buffer that transmits the signal of the switch block and the maximum number of outputs of the switch block, and exhibits more effects as the numbers of them increases.

The delay calculation part 12 according to the first example embodiment properly uses or does not use a correction delay leaf cell, depending on Total F/O. As a result, the accuracy of characterization of the crossbar switch (switch block) can be maintained.

Furthermore, as described above, when the number of resistance change elements in the crossbar switch SMUX1 which are in the ON state, is FO1=x, a capacitance and a resistance of the crossbar switch SMUX1 affect not only a delay D1 but also delays D2 to D4. However, as illustrated in FIGS. 5A and 5B, the degree of influence differs depending on whether the total sum of FO2, FO3 and FO4 is small or large. Therefore, the delay calculation part 12 may calculate the delay by the method described above when the sum of fanouts is large.

For example, in the above description, when calculating a correction delay, the delay calculation part 12 sets the fanouts of the cell logic block CLB2-4 to: FO2=FO3=FO4=1, and changes the fanout of the cell logic block CLB1: FO1 from 0 to 32. However, the delay calculation part 12 can set the fanouts of the cell logic block CLB2-4: FO2=FO3=FO4=4 and calculate the delays D1_4 (FO1), D2_4(FO1), D3_4(FO1) and D4_4(FO1) of the cell logic block CLB1-4 while changing the fanout of the cell logic block CLB1: FO1 from 0 to 32. The correction delays of D2 related to FO1, ΔD_seg2 (FO1=x), ΔD_seg2 (FO1=x), ΔD_seg3 (FO1=x) and ΔD_seg4 (FO1=x), are obtained according to expressions (18) to (20), respectively.

$$\Delta D\_seg2(FO1=x)=D2\_4(FO1=x)-D2\_4(FO1=0) \quad (18)$$

$$\Delta D\_seg3(FO1=x)=D3\_4(FO1=x)-D3\_4(FO1=0) \quad (19)$$

$$\Delta D\_seg4(FO1=x)=D4\_4(FO1=x)-D4\_4(FO1=0) \quad (20)$$

Similarly, correction delays related to the crossbar switches SMUX2 to 4, ΔD_seg1(FO2=x), ΔD_seg3 (FO2=x), ΔD_seg4(FO2=x), ΔD_seg1(FO3=x), ΔD_seg2 (FO3=x), ΔD_seg4(FO3=x), ΔD_seg1 (FO4=x), ΔD_seg2 (FO4=x), and ΔD_seg3 (FO4=x), are obtained according to expressions (21) to (29). The delays D1, D2, D3 and D4 are calculated by the expressions (14) to (17).

$$\Delta D\_seg1(FO2=x)=D1\_4(FO2=x)-D1\_4(FO2=0) \quad (21)$$

$$\Delta D\_seg3(FO2=x)=D3\_4(FO2=x)-D3\_4(FO2=0) \quad (22)$$

$$\Delta D\_seg4(FO2=x)=D4\_4(FO2=x)-D4\_4(FO2=0) \quad (23)$$

$$\Delta D\_seg1(FO3=x)=D1\_4(FO3=x)-D1\_4(FO3=0) \quad (24)$$

$$\Delta D\_seg2(FO3=x)=D2\_4(FO3=x)-D2\_4(FO3=0) \quad (25)$$

$$\Delta D\_seg4(FO3=x)=D4\_4(FO3=x)-D4\_4(FO3=0) \quad (26)$$

$$\Delta D\_seg1(FO4=x)=D1\_4(FO4=x)-D1\_4(FO4=0) \quad (27)$$

$$\Delta D\_seg2(FO4=x)=D2\_4(FO4=x)-D2\_4(FO4=0) \quad (28)$$

$$\Delta D\_seg3(FO4=x)=D3\_4(FO4=x)-D3\_4(FO4=0) \quad (29)$$

As described above, the numerical information generation apparatus 10 according to the first example embodiment reduces an amount of computation regarding the delay of the crossbar switch by separating the delay in the crossbar switch into the base delay and the correction delay and by separately calculating each delay (base delay, correction delay). Further, the numerical information generating apparatus 10 determines whether or not the fanout in each crossbar switch is treated as an independent variable, depending on the inter-CLB wiring resistance and the total fanout number. By treating the fanout number as an independent variable, it is possible to keep the calculated delay within an appropriate error range, even when the error becomes too large by the summing method. In other words, the delay error is suppressed by switching over the method for calculating the delay of the crossbar switch according to the fanout number and the inter-CLB wiring resistance.

[Variation]

The configuration and the like of the numerical information generation apparatus 10 described in the above embodiments are examples and are not intended to limit the configuration and the like. The numerical information generation apparatus 10 may encompass not only a module that calculates a delay (delay calculation part 12) but also a module that executes static timing analysis (STA) using the calculated delay.

The whole or part of the example embodiments disclosed above can be described as, but not limited to, the following Supplementary notes.

[Supplementary Note 1]

Refer to the numerical information generation apparatus from the first aspect.

[Supplementary Note 2]

The numerical information generation apparatus preferably according to supplementary note 1, wherein the calculation part switches over a generation method of a leaf cell that is calculated in a netlist for which a static timing analysis is executed depending on a resistance between the plurality of switches

[Supplementary Note 3]

The numerical information generation apparatus preferably according to supplementary note 2, wherein the calculation part switches over the generation method of a leaf cell calculated as a net list in executing a static timing analysis according to resistances between the plurality of switches and a sum of the fanout numbers of each of the plurality of switches.

[Supplementary Note 4] The numerical information generation apparatus preferably according to supplementary note 2 or 3, wherein the calculation part generates a leaf cell corresponding to the base delay and also generates a leaf cell corresponding to the correction delay as a leaf cell subordinate to a leaf cell corresponding to the base delay.

[Supplementary Note 5]

The numerical information generation apparatus preferably according to any one of supplementary notes 1 to 4, wherein the plurality of switches are supplied with power from one active element.

[Supplementary Note 6]

The numerical information generation apparatus preferably according to supplementary note 5, wherein the active element is a buffer circuit.

[Supplementary Note 7]

The numerical information generation apparatus preferably according to any one of supplementary notes 1 to 6, wherein the programmable logic integrated circuit includes an element that is capable to maintain a high impedance state between each of the switches.

[Supplementary Note 8]

The numerical information generation apparatus preferably according to any one of supplementary notes 1 to 7, further comprising:

an output part that outputs information regarding the delay of each of the plurality of switches calculated by the calculation part to outside.

[Supplementary Note 9]

Refer to the numerical information generation method from the second aspect.

[Supplementary Note 10]

Refer to the program from the third aspect.

[Supplementary Note 11]

In a programmable logic integrated circuit comprising a plurality of logic blocks and a plurality of switch blocks, each including a plurality of resistance change elements arranged in a matrix for switching over connections between a plurality of first wirings and a plurality of second wirings, a method comprising creating a computational propagation path for performing static timing analysis for analyzing signal waveform propagation performance of the programmable logic integrated circuit, wherein the method comprises characterizing the programmable logic integrated circuit used for static timing analysis.

[Supplementary Note 12]

In the computational propagation path for performing the static timing analysis according to supplementary note 11, the method comprising characterizing an active element providing the switch blocks with power, wherein the method comprises generating cells, the number of which matches the number of the switch blocks provided with power.

[Supplementary Note 13]

In the computational propagation path for performing the static timing analysis according to supplementary note 11, the method comprising switching over between a characterizing method depending on a total number of outputs of the switch blocks and the method according to supplementary note 12, based on a load of wiring between the switch blocks.

[Supplementary Note 14]

A method of calculating a subordinate cell according to supplementary note 12.

[Supplementary Note 15]

In a programmable logic integrated circuit according to supplementary note 1, wherein a circuit is characterized in that an element maintaining a high impedance state is inserted between the routing switch block and an adjacent routing switch block, a method comprising creating a propagation path for performing static timing analysis for analyzing signal waveform propagation performance of the programmable logic integrated circuit wherein the method comprises characterizing the programmable logic integrated circuit used for the static timing analysis.

[Supplementary Note 16]

In the propagation path for performing static timing analysis according to supplementary note 14, the method comprising a characterizing an active element supplying the switch blocks with power, wherein the method comprises generating, on the propagation path, cells, the number of which matches the number of the switch blocks supplied with power.

[Supplementary Note 17]

A method of calculating a subordinate cell according to supplementary note 16. It is noted that the mode of Note 9 and the mode of Note 10 can be expanded to the modes of Note 2 to Note 8 as is the case in the mode of Note 1.

The disclosures of the above patent literatures are incorporated herein by reference. Modifications and adjustments of the example embodiments or examples are possible within the framework of the entire disclosure (including the claims) of the present invention and based on the basic technical concept thereof. In addition, various combinations of various disclosed elements (including each element of each claim, each element of each example embodiment or example, each element of each drawing, and the like) or selection (including partial deletion) are possible within the scope of the entire disclosure of the present invention. That is, the present invention of course includes various variations and modifications that could be made by those skilled in the art according to the entire disclosure including the claims and the technical concept. In particular, with respect to the numerical ranges described herein, any numerical values or small range(s) included in the ranges should be construed as being expressly described even if not otherwise specified.

What is claimed is:

1. A numerical information generation apparatus comprising:
a processor; and
a memory in communication with the processor,
wherein the processor, when executing program instructions stored in the memory, receives information of a programmable logic integrated circuit that includes a plurality of crossbar switches, each including resistance change elements, calculates, for each of the plurality of crossbar switches, a base delay that is a delay in which influence of a load capacitance of other crossbar switch is excluded and a correction delay that is a delay caused by influence of a fanout of other crossbar switch, and calculates a delay of each of the plurality of crossbar switches, based on the base delay and the correction delay, corresponding to each of the plurality of crossbar switches.

2. The numerical information generation apparatus according to claim 1, wherein the processor switches over a generation method of a leaf cell included in a netlist for a static timing analysis, depending on a resistance value between the plurality of crossbar switches.

3. The numerical information generation apparatus according to claim 2, wherein the processor generates a leaf cell corresponding to the base delay and generates a leaf cell corresponding to the correction delay as a leaf cell subordinate to the leaf cell corresponding to the base delay.

4. The numerical information generation apparatus according to claim 1, wherein the plurality of crossbar switches are supplied with a signal from one active element.

5. The numerical information generation apparatus according to claim 4, wherein the active element is a buffer circuit.

6. The numerical information generation apparatus according to claim 1, wherein the programmable logic integrated circuit includes an element that is capable to maintain a high impedance state between each ones of the crossbar switches.

7. The numerical information generation apparatus according to claim 1, further comprising:

an output part that outputs, to outside, information regarding the delay of each of the plurality of crossbar switches calculated by the calculation part.

8. The numerical information generation apparatus according to claim 1, wherein the programmable logic integrated circuit includes N crossbar switches, each included in a corresponding cell logic block, where N is an integer of 2 or more, wherein the processor calculates the base delay of i-th crossbar switch, where i is an integer from 1 to N, using circuit simulation with a fanout number of each crossbar switch other than the i-th crossbar switch set to 0, while a fanout number of the i-th crossbar switch being varied as a variable.

9. The numerical information generation apparatus according to claim 8, wherein the processor calculates a j-th delay for the i-th crossbar switch, where j is an integer from 1 to N and not equal to i, based a difference between a delay of the i-th crossbar switch in a case where a fanout number of the j-th crossbar switch takes a predetermined positive integer value and a delay of the i-th crossbar switch in a case where the fanout number of the j-th crossbar switch is set to 0, and obtains the correction delay of the i-th crossbar switch by summing, for j from 1 to N except i, the j-the delay for the i-th crossbar switch.

10. The numerical information generation apparatus according to claim 1, comprising a 2-dimensional table including delay error information for a summing method with a total fanout number which is a total sum of respective fanout numbers of the plurality of crossbar switches, as a first index, and with a wiring resistance value between cell logic blocks, each including the crossbar switch, as a second index, wherein the processor estimates a delay error of a cell logic block including a crossbar switch which is a characterization target, from a total fanout number and a wiring resistance value between cell logic blocks, with reference to the table to determine whether or not the delay error estimated satisfies a predetermined criterion, and the processor, when finding that the delay error does not satisfy the criterion, calculates the delay of the crossbar switch which is a characterization target, based on the base delay and the correction delay, while when the criterion is satisfied, the processor calculates a delay of the crossbar switch which is a characterization target, using the summing method.

11. The numerical information generation apparatus according to claim 10, wherein when the delay error of a cell logic block including a crossbar switch which is a characterization target does not satisfy the criterion, the processor generates a leaf cell corresponding to the base delay in a netlist for a static timing analysis and generates one or more leaf cells corresponding to one or more correction delays as leaf cells subordinate to the leaf cell corresponding to the base delay, in the netlist for a static timing analysis.

12. A numerical information generation method using a computer, the method comprising:

receiving information of a programmable logic integrated circuit that includes a plurality of crossbar switches, each including resistance change elements;

calculating, for each of the plurality of crossbar switches, a base delay that is a delay in which influence of a load capacitance of other crossbar switch is excluded and a correction delay that is a delay caused by influence of a fanout of other crossbar switch; and calculating a delay of each of the plurality of crossbar switches based on the base delay and the correction delay, corresponding to each of the plurality of crossbar switches.

13. The numerical information generation method according to claim 12, comprising switching over a generation method of a leaf cell included in a netlist for a static timing analysis, depending on a resistance value between the plurality of crossbar switches.

14. The numerical information generation method according to claim 13, comprising generating a leaf cell corresponding to the base delay; and generating a leaf cell corresponding to the correction delay as a leaf cell subordinate to the leaf cell corresponding to the base delay.

15. A non-transitory computer readable storage medium storing a program causing a computer to execute processing comprising:

receiving information of a programmable logic integrated circuit that includes a plurality of crossbar switches including resistance change elements;

calculating, for each of the plurality of crossbar switches, a base delay that is a delay in which influence of a load capacitance of other crossbar switch is excluded and a correction delay that is a delay caused by influence of a fanout of other crossbar switch; and calculating a delay of each of the plurality of crossbar switches based on the base delay and the correction delay corresponding to each of the plurality of crossbar switches.

16. The non-transitory computer readable storage medium according to claim 15, storing the program causing the computer to execute:

switching over a generation method of a leaf cell included in a netlist for a static timing analysis, depending on a resistance value between the plurality of crossbar switches.

17. The non-transitory computer readable storage medium according to claim 16, storing the program causing the computer to execute:

generating a leaf cell corresponding to the base delay; and generating a leaf cell corresponding to the correction delay as a leaf cell subordinate to the leaf cell corresponding to the base delay.

\* \* \* \* \*